United States Patent
Sulmone et al.

(10) Patent No.: US 6,688,024 B1
(45) Date of Patent: Feb. 10, 2004

(54) FIRE TRUCK WATER CONNECTION CAP WITH A CUSTOMIZABLE INSERT FEATURE

(76) Inventors: Michael Sulmone, 2009 Sweetgum La., Collegeville, PA (US) 19426; Richard E Teske, 1501 Sandy Hill Rd., Plymouth Meeting, PA (US) 19462; James M Maheer, 9 Ridgewood Ave., Delran, NJ (US) 08075; Joseph Dawidziuk, 10 Timberfare Cir., Plymouth Meeting, PA (US) 19462

(*) Notice: Subject to any disclaimer, the term of this patent is extended or adjusted under 35 U.S.C. 154(b) by 166 days.

(21) Appl. No.: 10/074,645

(22) Filed: Feb. 13, 2002

Related U.S. Application Data
(60) Provisional application No. 60/268,284, filed on Feb. 13, 2001.

(51) Int. Cl.⁷ .............................................. B65D 39/16
(52) U.S. Cl. ......................... 40/311; 215/220; 206/534
(58) Field of Search .................. 40/331, 311; 116/308, 116/309, 311, 312, 314; 215/220, 230, 252, 290, 291, 292; 206/534; 137/296, 800, 371, 300

(56) References Cited

U.S. PATENT DOCUMENTS

| | | | | | |
|---|---|---|---|---|---|
| 2,350,733 | A | * | 6/1944 | Drotning | 116/312 |
| 4,365,722 | A | * | 12/1982 | Kramer | 215/220 |
| 5,358,117 | A | * | 10/1994 | Adams | 206/534 |
| 5,967,350 | A | * | 10/1999 | Jones | 215/222 |

* cited by examiner

*Primary Examiner*—Cassandra H. Davis

(57) ABSTRACT

A fire truck water connection cap, which has an insert installed on the outside that displays a variety of different artwork forms. It is customizable for the individual fire department. The means of retention allows for the "upright" placement of the insert regardless of orientation of the cap when it is tight to the pump inlet. The use of an elastomeric spring presses the insert against a retention ring which holds it in place after it is rotated to the correct position. The cap also uses grips on the ends of the handles to resist a firefighter's hands or a soft mallet from slipping off the end.

1 Claim, 1 Drawing Sheet

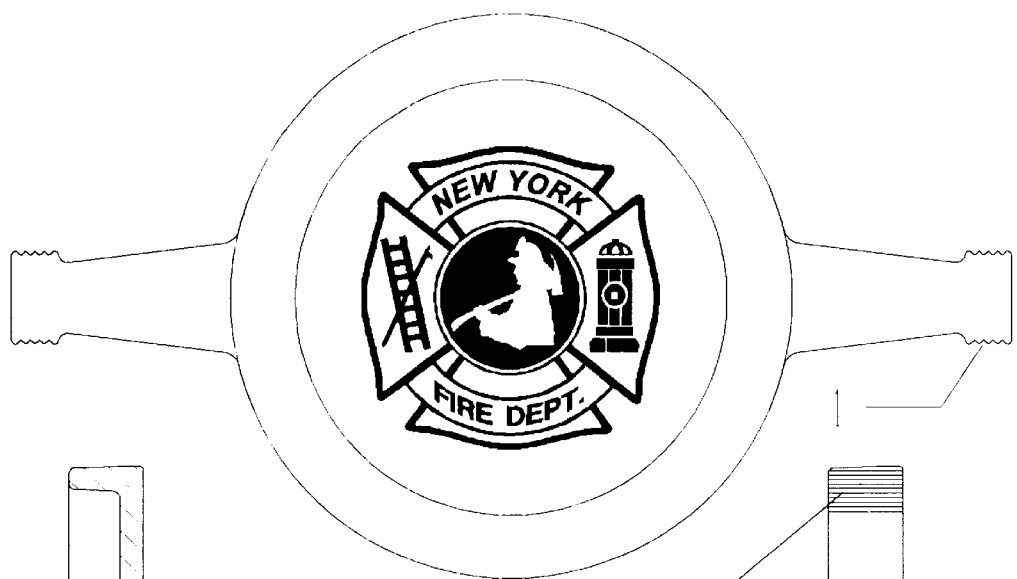
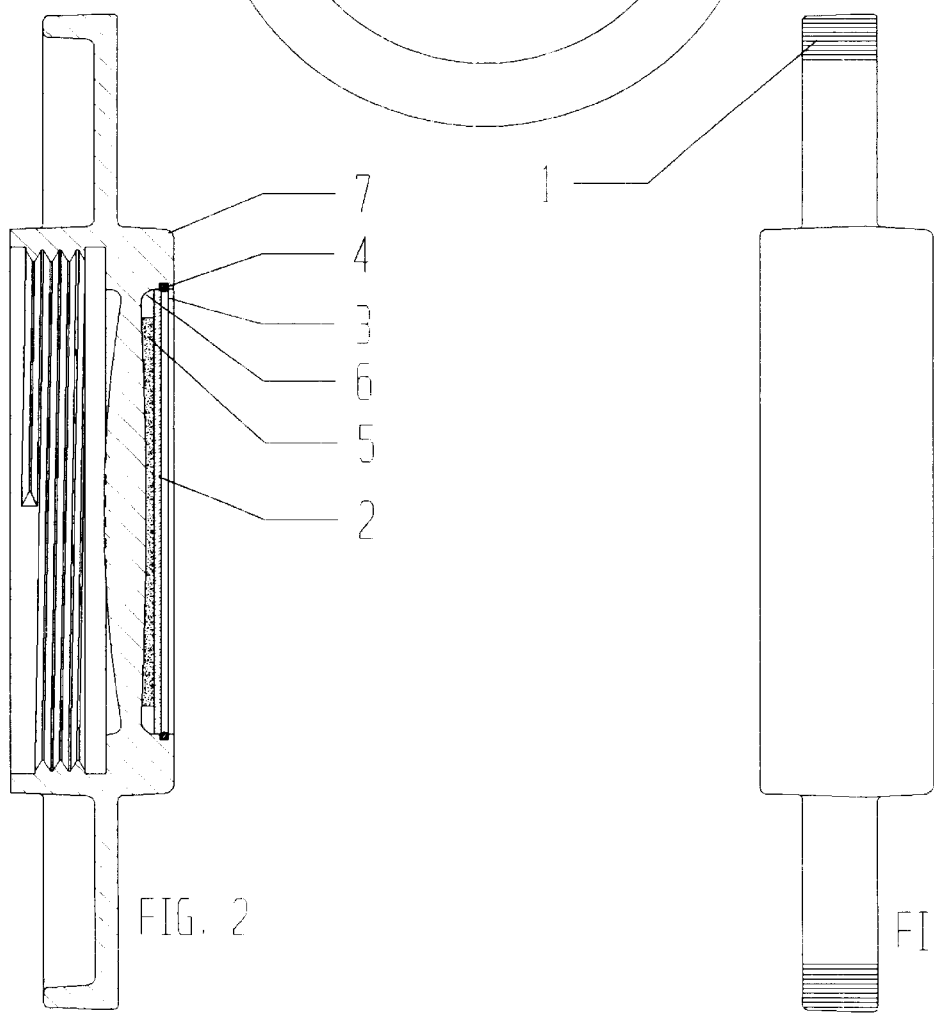
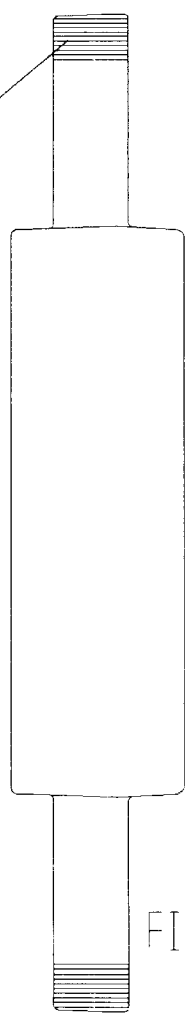

FIRE TRUCK WATER CONNECTION CAP WITH A CUSTOMIZABLE INSERT FEATURE

CROSS-REFERENCE TO RELATED APPLICATIONS

This utility patent application claims priority of Provisional Patent Application 60/268,284 filed Feb. 13, 2001 by Michael Sulmone, James J. Maher, Richard E. Teske and Joseph Dawidziuk.

BACKGROUND OF THE INVENTION

1. Field of the Invention

The invention relates to a new type of cap that seals the water port of a fire truck's water pump. Fire trucks typically use caps to close off one or more of the openings of the pump and associated plumbing. The caps that are most common on the inlet side of the pump are of a two-handle variety with threads to engage the pump.

2. Description of Prior Art

Typically fire truck caps are not only functional, but decorative as well. Firefighters are typically proud of their trade, the equipment they use and the individual station where they serve. The caps are typically chrome plated and are kept shinny and presentable and are a prominent item on the side of the fire truck. One feature of invention covered by this application provides a means for the firefighters to display their pride on the caps with customized inserts. The cap is also designed to look attractive even without the insert installed, by optically hiding a retention groove feature next to a concave curvature in the mirror-like chrome surface.

A rubber seal washer that is installed in the cap is used to seal the water in the pump from the air on the outside. When the cap is screwed onto the inlet, a seal is formed with the rubber washer. To properly seal the opening, it is required to apply a large amount of force to the handles. It is common for a firefighter's hands to slip off of the handles of current design. Oftentimes, firefighters will resort to using a mallet to hit the handle(s) until a good seal is achieved. This is sometimes done because it is difficult to achieve the required force by just turning the handles or the rubber washer is old and/or damaged. Due to the smooth, chrome plated surfaces of current cap handle designs, the mallet head slips off of the handle and strikes the operators panel and damages it. Another feature of the invention covered by this application provides for a means to resist hand slippage, which allows for a higher sealing force. It also provides for a convenient spot to hit with a mallet that will resist slippage of the mallet head.

SUMMARY OF THE INVENTION

The invention is a fire truck suction cap with an insert installed on the outside that displays a variety of different artwork designs. It is customizable for the individual fire department. The means of retention allows for the "upright" placement of the insert regardless of orientation of the cap when it is tight to the pump inlet. The cap also uses grips on the ends of the handles to resist a firefighter's hands or a mallet from slipping off the end.

BRIEF DESCRIPTION OF THE DRAWINGS

FIG. 1 is a drawing that shows the cap with a customized insert, as it would appear on the side of a fire truck.

FIG. 2 is a drawing that shows a cross-sectional view of the cap/insert assembly.

FIG. 3 is a drawing that shows the exterior side view of the cap.

DETAILED DESCRIPTION AND OPERATION OF THE INVENTION

FIG. 1 shows the view of the cap from the side with the insert installed. For graphical representation, the figure illustrates a cap with an insert installed that displays a New York Fire Department logo. The logos may vary greatly by many factors including the fire department or even a particular station. The personalized caps provide a feature that allows the fire fighters to customize the graphics down to the individual station level. The customized feature of the caps are not limited to just the suction side of the pump, but also may be used in conjunction with discharge side caps. Several technologies may be used to create the graphics, including inkjet printers. The graphics may be placed on the front surface of the insert 2 or on the back surface of a transparent insert 2. The use of a UV resistant, transparent material for the insert 2 allows for the use of common non-UV stabilized inks.

FIG. 2 shows a cross-sectional view of the cap assembly. The insert 2 is a circular disk that fits into a recess in the cap body 7. It is held in the body 7 with the use of a retention O-ring 4. Singular or multiple elastomeric spring elements 5 are used to securely press the insert 2 against the retention O-ring 4. Friction between the retention O-ring 4 and the insert 2 keep the insert 2 from spinning freely relative to the cap body 7. The insert 2 is easily rotated by hand. To change the alignment of the insert 2 relative to the cap body 7, one would merely press the insert 2 in toward the threaded end of the cap body 7, which compresses the elastomeric spring(s) 5. This disengages the insert from the retention O-ring 4, thus eliminating the friction from that particular interface and the insert 2 can then be rotated freely. Once the insert is aligned in the desired position, releasing the pressure from the insert 2 will allow the elastomeric springs to engage the insert 2 with the retention O-ring 4. The type of spring used is not limited to an elastomeric type, but may be constructed of a variety of materials and/or geometries. Also, the O-ring used may be made of a variety of different materials with circular or non-circular cross-sections.

The groove 3 where the retention O-ring 4 resides is machined in close proximity to a concave curve 6. The close proximity of these two elements combined with a smooth reflective surface provides an optical camouflage that hides the groove 3, thus also allowing the cap to remain attractive and presentable even with the insert 2 and related components removed.

The cap is designed with handles that are used to tighten and loosen it from the pump intake port. Handles are a common feature in the industry and eliminate the need for a spanner wrench. This design is and improvement over previous designs because it incorporates anti-slip ridges 1 into the handle ends. The ridges 1 resist hand/glove or mallet slippage during operation.

What is claimed is:

1. A closure for fire truck water ports comprising:

a body having an upper surface,
 a lower portion having internal threads, and
 a pair of handles extending from opposite sides of the body;

wherein the upper surface has a recessed central area with a central face;

a display plate rotatably mounted within the recessed area;

a spring in the form of sponge foam material is placed between the central face of the recessed area and the rear surface of the display plate; and an O-ring for inhibiting the rotating of the display plate and for retaining the display within the body; the o-ring is mounted within the recessed area such that the spring forces the display plate against the o-ring in a non-rotating orientation;

and wherein
the plate is allowed to rotate when a force is applied to the upper surface of the plate thereby depressing the foam spring and disengaging the plate from the O-ring thereby allowing the plate to freely rotate with the recessed area to place the display plate in an upright orientation.

* * * * *